US011859594B2

(12) United States Patent
Warfen et al.

(10) Patent No.: US 11,859,594 B2
(45) Date of Patent: Jan. 2, 2024

(54) METHOD FOR OPERATING A WIND TURBINE, WIND TURBINE, AND COMPUTER PROGRAM PRODUCT

(71) Applicant: SENVION GmbH, Hamburg (DE)

(72) Inventors: Karsten Warfen, Weede/Söhren (DE); Stefan Behl, Neumünster (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 322 days.

(21) Appl. No.: 17/053,671

(22) PCT Filed: May 7, 2019

(86) PCT No.: PCT/EP2019/061677
§ 371 (c)(1),
(2) Date: Nov. 6, 2020

(87) PCT Pub. No.: WO2019/215147
PCT Pub. Date: Nov. 14, 2019

(65) Prior Publication Data
US 2021/0071639 A1 Mar. 11, 2021

(30) Foreign Application Priority Data
May 7, 2018 (DE) ...................... 10 2018 003 745.3

(51) Int. Cl.
F03D 7/04 (2006.01)
F03D 17/00 (2016.01)
(Continued)

(52) U.S. Cl.
CPC ............. F03D 7/047 (2013.01); F03D 17/00 (2016.05); F03D 7/0284 (2013.01); F05B 2270/32 (2013.01); G05B 23/0291 (2013.01)

(58) Field of Classification Search
CPC ........ F03D 7/047; F03D 17/00; F03D 7/0284; F05B 2270/32; G05B 23/0291;
(Continued)

(56) References Cited

U.S. PATENT DOCUMENTS

2005/0229004 A1* 10/2005 Callaghan ............. H04L 9/3268
713/185
2010/0013227 A1* 1/2010 Weitkamp ............... F03D 7/042
290/44

(Continued)

FOREIGN PATENT DOCUMENTS

CN        107110120        8/2017
DE    102010033229 A1     2/2012
(Continued)

OTHER PUBLICATIONS

PCT International Search Report and Written Opinion for International Application No. PCT/EP2019/061677 filed May 7, 2019; dated Aug. 2, 2019; 7 pgs.

(Continued)

Primary Examiner — Charles Cai
(74) Attorney, Agent, or Firm — Alix, Yale & Ristas, LLP

(57) ABSTRACT

A management system for controlling a wind turbine according to prescribed rules and a safety system, separate from the management system, for monitoring the wind turbine on the basis of operational characteristic values, wherein the safety system transfers the wind turbine to a safe plant state independently of the management system if safety-critical operational characteristic values violate safety parameters stored in the safety system, in order to change at least one safety parameter stored in the safety system a parameter block comprising the at least one safety parameter and at least two safety features is supplied to the safety system and accepted by the safety system only after a positive check on (Continued)

the safety features, wherein the check on at least one of the safety features requires comparison against check information available directly on the wind turbine.

20 Claims, 3 Drawing Sheets

(51) Int. Cl.
*F03D 7/02* (2006.01)
*G05B 23/02* (2006.01)

(58) Field of Classification Search
CPC ....... Y02E 10/72; Y04S 40/20; H04L 9/3236; H04L 9/3247; G06F 21/44
See application file for complete search history.

(56) References Cited

U.S. PATENT DOCUMENTS

2012/0257968 A1* 10/2012 Dalsgaard ............ F03D 7/0264
416/37
2015/0115609 A1* 4/2015 Bohlen .................... F03D 7/00
290/44
2017/0363065 A1 12/2017 Jakobs et al.
2018/0076972 A1* 3/2018 Kashiwase ........ H04L 12/40006
2020/0059176 A1* 2/2020 Ganireddy ............. H02P 9/007

FOREIGN PATENT DOCUMENTS

| DE | 102012204446 A1 | 9/2013 |
| EP | 1519040 A1 | 3/2005 |
| EP | 1783365 A2 | 5/2007 |
| EP | 3101275 A1 | 12/2016 |
| EP | 3385921 A1 | 10/2018 |
| WO | 2008009354 A2 | 1/2008 |

OTHER PUBLICATIONS

German Search Report for File No. 10 2018 003 745.3; Applicant: Senvion GmbH; Created on: Feb. 28, 2019; 10 pgs.

* cited by examiner

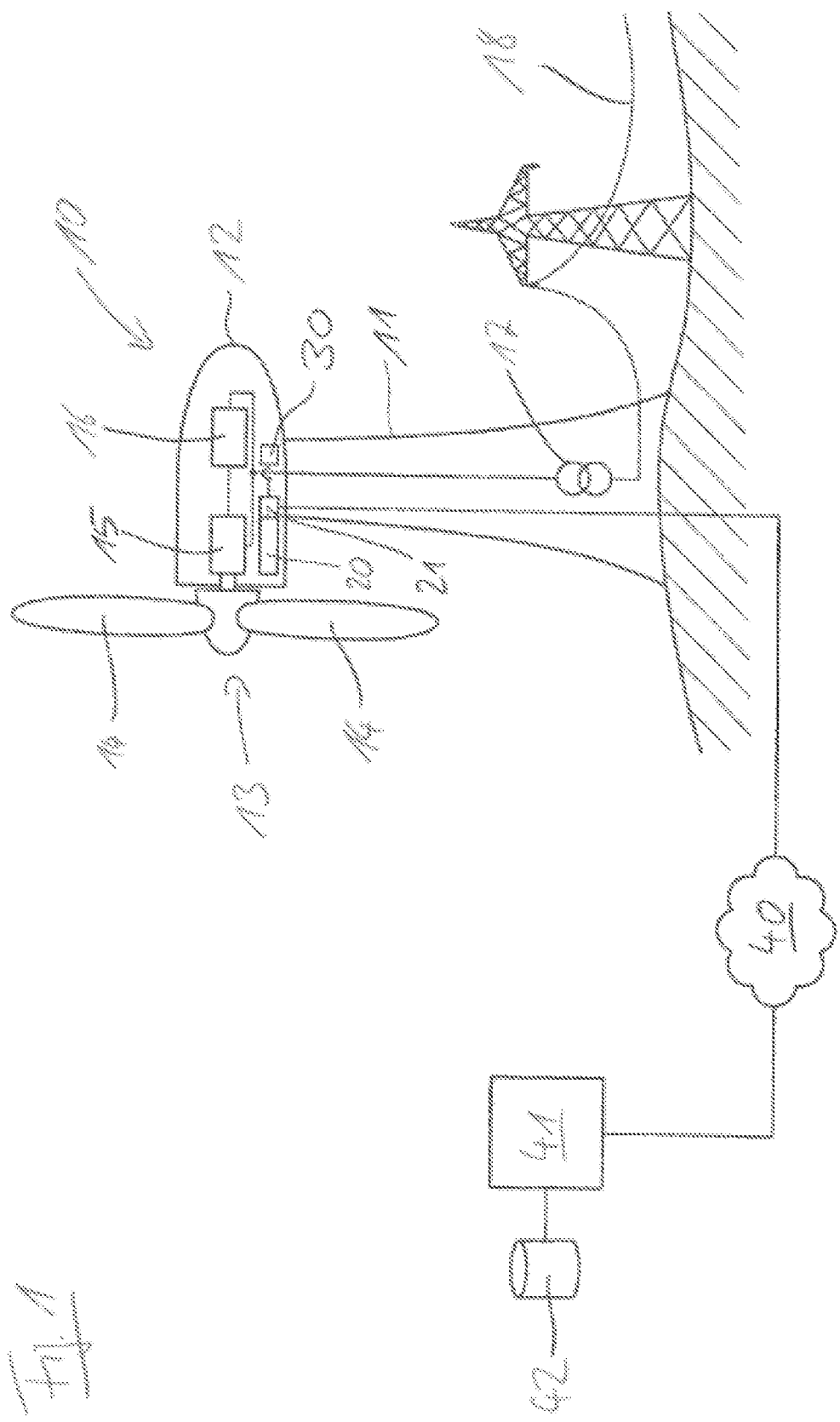

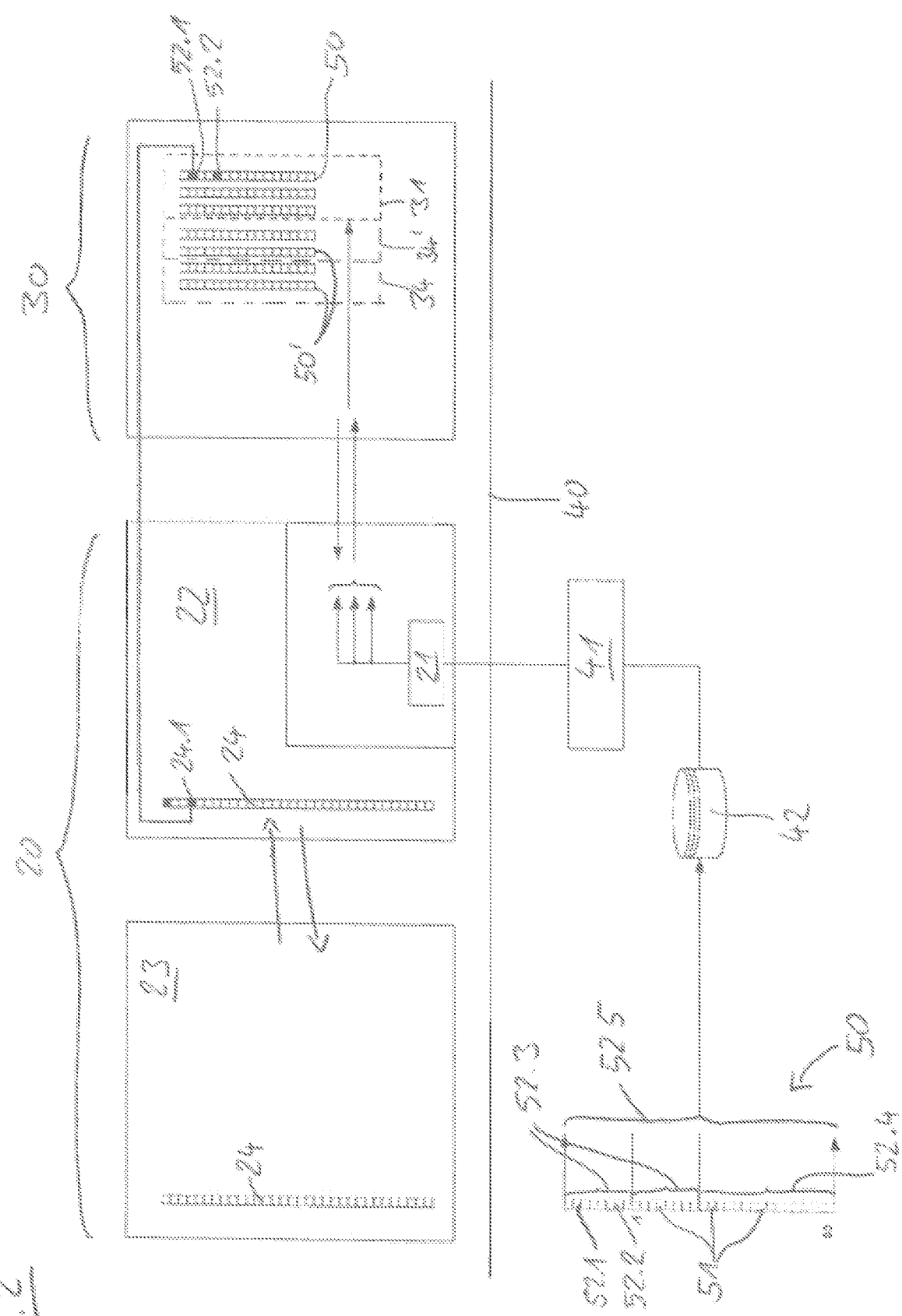

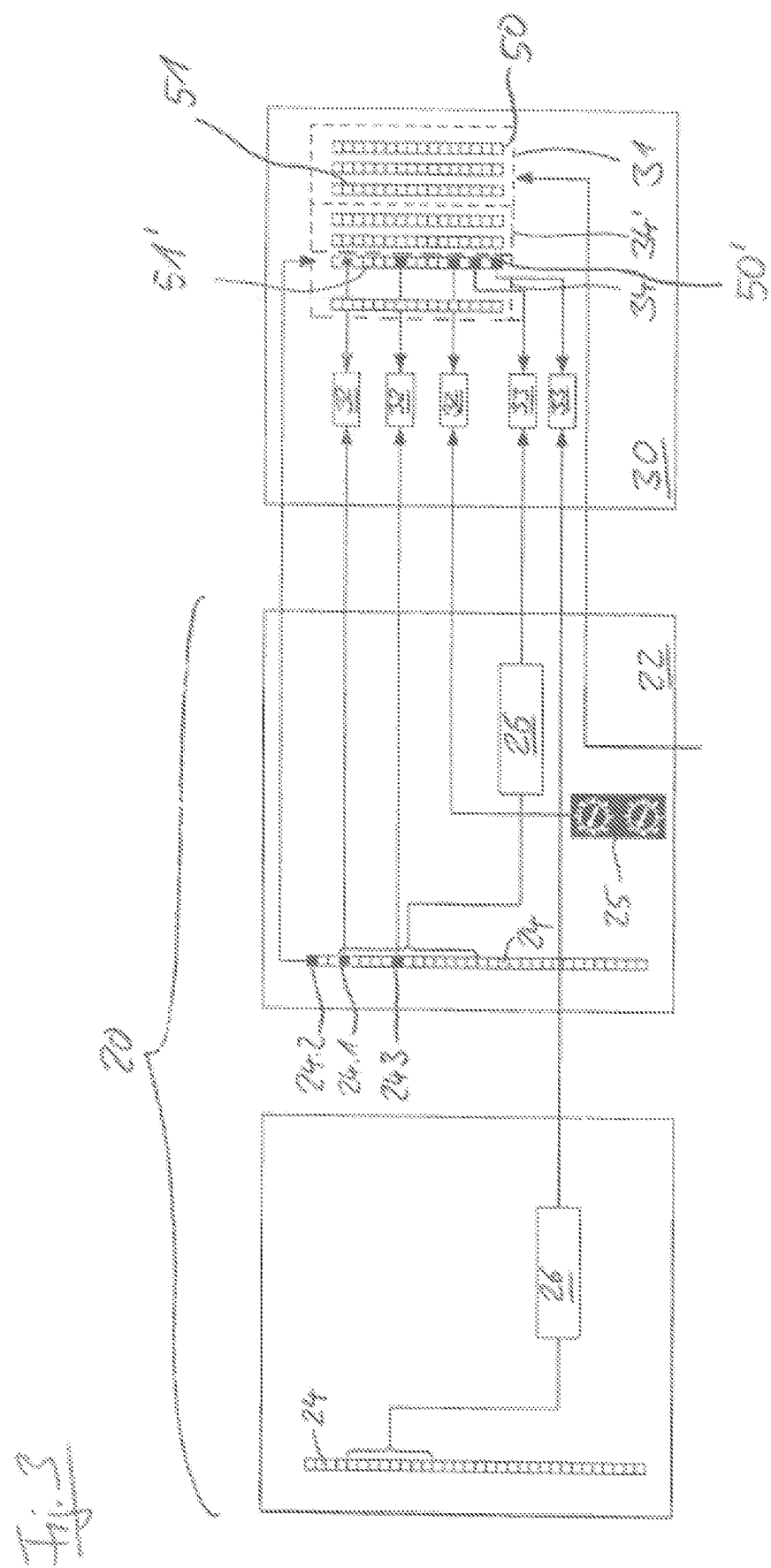

METHOD FOR OPERATING A WIND TURBINE, WIND TURBINE, AND COMPUTER PROGRAM PRODUCT

BACKGROUND

The invention relates to a method for operating a wind turbine, a wind turbine designed to perform this method and a corresponding computer program product.

Wind turbines are known from the prior art. They comprise a rotor arranged on a nacelle so as to be rotatable about a substantially horizontal axis, wherein the nacelle is arranged on a tower so as to be rotatable about a vertical axis. The rotor usually comprises three rotor blades adjustable in terms of blade pitch angle and drives a generator, possibly via a rotor shaft and a gear system. A wind-induced rotational movement of the rotor can thus be converted into electrical energy, which can then be supplied to an electricity grid via converters and/or transformers—also at least sometimes directly, depending on the design of the generator.

In order to control the various components of a wind turbine there is provision for a control device directly on the wind turbine, which takes measured values and control specifications obtained directly from the wind energy or transmitted externally, for example by the grid operators, as a basis for controlling the wind turbine. The control device is highly complex and can be produced only by means of software implementation. The software-based control is parameterized using a multiplicity of parameters (often 2000-3000 parameters).

To protect the surroundings of the wind turbine from hazards in the event of malfunction of the wind turbine and in particular of the control device thereof, there is provision for monitoring, performed separately from the actual control, that monitors compliance with prescribed operating ranges and, if the prescribed operating ranges are left, transfers the wind turbine, possibly bypassing the control device, to a safe operating state, usually stops it or transfers it to a zero-output spin mode. As an alternative or in addition to purely hardware-based monitoring as final safety shutdown, which stops the wind turbine in good time before rotational speeds or vibrations that threaten the structural integrity occur, for example, there is also provision for control-oriented monitoring that monitors compliance with fundamentally freely definable operating ranges during operation.

Owing to their relevance to safety, changes to the operating ranges prescribed for the monitoring are handled very restrictively. These operating ranges can usually be changed only directly on the hardware in the plant, e.g. on the speed monitoring relay, or on a terminal in the plant itself by a user who is specially qualified therefor and identified by means of a username and password. This makes changing the operating ranges prescribed for the monitoring very complicated, which is why they tend to be of conservative design so as not to have to be changed at all if possible over the life of a wind turbine. Even if appropriate changes are made only by specially qualified users, it is still not possible to completely rule out errors during the input of the parameters defining an operating range.

Owing to the continually increasing complexity of wind turbines and the knowledge of the optimum operation thereof utilizing the potential of the wind turbines in the best possible way, which knowledge is sometimes obtainable only in the course of operation of wind turbines of a specific type, it is desirable to change the operating ranges, possibly even repeatedly, over the life of a wind turbine. However, this would require enormous effort and a large number of users specially qualified therefor in the prior art, in which case there continues to be the risk of a critical bad definition of an operating range.

SUMMARY OF THE INVENTION

It is therefore the object of the present invention to provide a method for operating a wind turbine, a wind turbine and a computer program product in which the disadvantages from the prior art no longer arise or arise only to a reduced extent.

Accordingly, the invention relates to a method for operating a wind turbine comprising a management system for controlling the wind turbine according to prescribed rules and a safety system, separate from the management system, for monitoring the wind turbine on the basis of operational characteristic values, wherein the safety system transfers the wind turbine to a safe plant state independently of the management system if safety-critical operational characteristic values violate safety parameters stored in the safety system, wherein in order to change at least one safety parameter stored in the safety system a parameter block comprising the at least one safety parameter and at least two safety features is supplied to the safety system and accepted by the safety system for the monitoring only after a positive check on all of the safety features, wherein the check on at least one of the safety features requires comparison against check information available directly on the wind turbine.

Furthermore, the invention relates to a wind turbine comprising a rotor having multiple rotor blades, which are adjustable in terms of blade angle, that is arranged rotatably on a nacelle arranged rotatably on a tower and is connected to a generator, arranged in the nacelle, for converting wind energy acting on the rotor into electrical energy, a management system for controlling the wind turbine according to prescribed rules and a safety system, separate from the management system, for monitoring the wind turbine on the basis of operational characteristic values, wherein the safety system is designed to transfer the wind turbine to a safe plant state independently of the management system if safety-critical operational characteristic values violate safety parameters stored in the safety system, wherein the wind turbine is designed to perform the method according to the invention.

The invention also relates to a computer program product comprising program parts that, when loaded in a computer, preferably the plant control unit of the wind turbine, are designed to perform the method according to the invention.

First of all, a few terms used in connection with the invention will be explained:

"Operational characteristic values" means actual values measured during the operation of a wind turbine, or derived from measured variables, and/or setpoint values ascertained by the management system that reflect the present operating state of the wind turbine and the components thereof.

"Configuration parameters" are information concerning the wind turbine itself, for example the key technical data thereof or type designations of the wind turbine or components thereof.

"Safety parameters" can be used to define a permissible operating state or a permissible operating window. The safety parameters can comprise for example fixed limit values, or limit values variable on the basis of the operational characteristic values, and/or fixed limit characteristic curves, or limit characteristic curves variable on the basis of the operational characteristic values.

Since, according to the invention, new safety parameters are supplied to the safety system in the form of a parameter block, which additionally also has safety features, it is possible to ensure that only safety parameters suitable for the respective wind turbine are accepted by the safety system and taken as a basis for the ultimate monitoring. This is ensured by virtue of the check on at least one of the safety features requiring comparison against check information available directly on the wind turbine. As a result, only safety parameters that have been positively determined to be either directly intended or at least completely suitable for the respective wind turbine are actually accepted. Since an appropriate safety check is performed, it is possible for at least one safety parameter of the safety system, which can also mean an update of previously stored safety parameters, to be accepted by any user directly on the plant itself, for example as a result of the parameter block being supplied via a suitable interface. It is also possible for safety parameters to be supplied or updated by remote maintenance or remote data transmission, in principle. Unlike in the prior art, it is thus no longer fundamentally necessary for the changes to the operating ranges prescribed for the monitoring to be performed by a specially qualified user directly on the wind turbine itself. On account of the highly critical significance of the safety parameters for the operation and the safety of a wind turbine, it is preferred in this instance if the change to the safety parameters stored in the safety system is made via a data connection that is separate from that for the monitoring and control of the operation of the wind turbine using the management system and/or via a special user interface. By way of example there may be provision for a web portal separate from the other management for the purpose of changing the safety parameters, or special software may be required that is available only to a specially qualified group of people. This prevents the safety parameters stored in the safety system from being unintentionally changed if the intention is actually only to change operational parameters of the management.

The check information used for checking at least one of the safety features can be information about the plant type and/or the plant configuration of the wind turbine. The information about the plant type of a wind turbine typically comprises its (fundamentally unique, at least internally to manufacturers) type designation, rated power, rotor diameter, tower height and/or other properties that are identical for all wind turbines of the same plant type. The plant configuration can be used to indicate, on a plant-specific basis, what options or components are installed for the respective wind turbine. As such, the wind turbines of the same plant type may be equipped with components from different suppliers, which means that two wind turbines, although of the same plant type, have different gear systems or plant control units, for example. It is also possible for just some of the wind turbines of the same plant type to be equipped with optional components, such as for example a deicing system for the rotor blades. These plant-specific peculiarities of the configuration can be selected on the management system using hardware switches intended therefor. It is preferred in this instance if at least one configuration parameter is selectable on the wind turbine using an appropriate hardware switch, which usually ensures a high level of protection against manipulation for the applicable configuration parameter. It is alternatively possible for said configuration parameters to be stored in the management system and/or the safety system during startup. In both cases, the information is available as configuration parameters. To check a safety feature on the basis of configuration parameters, there may be provision for example for the safety feature to comprise data concerning information, mapped in the configuration parameters, about the plant type and the plant configuration and for the check to deliver a positive result only if the data of the safety feature are completely concordant with the corresponding actual configuration parameters.

A further safety feature to be checked can be at least one checksum, preferably a cyclic checksum, a hash value and/or a digital signature for the safety parameters, the parameter block and/or respective parts thereof. Appropriate measures can be used to ensure that the safety parameters, the parameter block or respective parts thereof are transmitted without error and/or are unmanipulated. A checksum allows errors occurring during the transmission to be reliably detected and the transmission process to be repeated if required. There may preferably also be provision for a cyclic redundancy check that allows safe correction of transmission errors. In order to increase the protection against manipulations of individual or all of the safety parameters, a hash value can be ascertained at least for the safety parameter in question or the part of the parameter block that comprises this safety parameter, which hash value can be checked by the safety system. Alternatively, it is also possible to use a digital signature or an encryption. It is also possible to connect the different mechanisms to one another. As such, for example a hash value can first be ascertained for a parameter block and subsequently a cyclic checksum for the parameter block and the hash value can be formed, so that the transmission of the parameter block and the hash value can first be followed by an error check being performed on the basis of the checksum before the hash value check subsequently takes place.

Alternatively or additionally, a further safety feature provided can be a validity period contained in the parameter block. The validity period allows safety parameters that have not yet been approved for actual use and therefore have no validity period, or obsolete safety parameters with an expired validity period, to be prevented from being accepted by the safety system.

Alternatively or additionally, the parameter block can comprise data suitable for comparison against the control rules applied by the management system as a further safety feature. This applies in particular if the control rules applied by the management system are parameterized, which means that said data may be designed for comparison against the parameterization values of the control rules and/or checksums formed therefrom. It is thus possible to check whether the safety parameters contained in the parameter block are permissible for the control currently applied on the basis of the parameterization values by the management system. Besides parameterization values actually taken into account for the control, an appropriate comparison can also be performed on the basis of possibly provided identification data or version numbers in the set of parameterization values.

The parameter block preferably contains information about the maximum permissible operating period under the safety parameters contained in the parameter block. As a result of the maximum time in which a wind turbine can be operated under the safety parameters of the parameter block being stipulated in this way, it is possible to ensure for example that a test mode with changed safety parameters is automatically terminated after the prescribed operating period, since the safety parameters in question then become invalid.

It is preferred if the parameter block contains information about the mode of operation for which the contained safety parameters are valid. This fundamentally allows the safety parameters of a parameter block to be used for monitoring the operation of a wind turbine only if the latter is operated in that mode of operation for which the parameter block is intended. The effect that can be achieved thereby is that for example operation under weather conditions that arouse a fear of ice deposits on the rotor blades is monitored using the safety parameters adapted therefor. The safety system is then preferably designed to use the set of safety parameters that is suitable for a specific mode of operation for the actual monitoring.

The safety system preferably comprises default safety parameters for if no valid safety parameters are available for the present mode of operation of the wind turbine. The default safety parameters may be combined in a default parameter block.

The default safety parameters may be chosen in such a conservative manner that safe operation of the wind turbine is possible in the present mode of operation or in all modes of operation. It is also possible for the default safety parameters to bring about a transfer of the wind turbine to a safe plant state, for example the zero-output spin mode.

The default safety parameters may preferably be permanently integrated in the operating software of the safety system in order to be able to safely rule out manipulation of the default safety parameters. It is fundamentally also possible, however, for said default safety parameters to be able to be changed in accordance with the method according to the invention. There is preferably provision for at least two default safety parameter blocks, a first default safety parameter block applying to all operating states of the wind turbine in its actual configuration, a second default safety parameter block applying to all wind turbines of the same type, but possibly different configuration. The "configuration" in this instance comprises in particular details concerning the tower and the rotor blades of the wind turbine, for example tower height and rotor blade length. The second default safety parameter block, which is preferably integrated unalterably in the operating software of the safety system, ensures safe minimal operation of the wind turbine, regardless of its ultimate configuration. The first default safety parameter block can, by contrast, take into consideration the actual configuration of the wind turbine and be fundamentally variable. If it is necessary to resort to default safety parameters because no valid safety parameters are available, operation is fundamentally maintained using the default safety parameters of the first default safety parameter block, and the default safety parameters of the second default safety parameter block are resorted to only if the default safety parameters of the first default safety parameter block should not be valid—for example because they are intended for another configuration or are damaged. This ensures safe operation of the wind turbine if the first default safety parameter block is inadmissible, contrary to expectation.

Even if two safety features are already sufficiently safe, it is preferred if the parameter block comprises at least three, more preferably at least four, different safety features. Each additional safety feature increases the protection against error and manipulation.

It is particularly preferred if at least one of the safety features relates to at least one configuration parameter of the wind turbine. In this case it is preferred if one of the at least one further safety features relates to at least some of the safety parameters. This firstly ensures that the safety parameters are actually changed only if the parameter block is actually intended for the wind turbine; secondly, it ensures—depending on the safety feature(s) used, see above—that the safety parameters to be accepted are not manipulated, transmitted without error and/or permissible for monitoring the wind turbine. Said further safety feature can also relate to the parameter block as a whole or to parts thereof, so long as at least some of the safety parameters are included as well.

The safety parameters can comprise for example a maximum rotational speed to avoid an overspeed or a limit value for maximum permissible vibrations. A parameter block can comprise for example 5 to 60 safety parameters.

The transfer of the wind turbine to a safe operating state can be in particular stoppage of the plant or transfer to a zero-output spin mode.

It is possible for various parameter blocks for different modes of operation and/or one or more default parameter sets to be combined to form a parameter block set. In this case it may be sufficient if the invention's check on the safety features is performed uniformly for the entire parameter block set and not for each parameter block contained in the parameter block set individually.

Combining multiple parameter blocks, possibly including one or more default safety parameter blocks, in a parameter block set is advantageous in particular if the parameter blocks thus combined each have in each case only short validity periods and/or operating periods for different modes of operation of the wind turbine or. The safety system can also have a memory for storing multiple parameter blocks, said memory being able to be filled using a parameter block set or by means of sequential transmission of multiple parameter blocks, and may be designed to take the mode of operation of the wind turbine as a basis for performing the safety monitoring on the basis of the safety parameters of a respective valid parameter block. The same naturally also applies when the validity period and/or operating period of a parameter block has expired. In this case the safety system can resort to the safety parameters of a different parameter block that is still valid and/or intended for the present mode of operation, in a manner comparable to the already explained resorting to default safety parameters.

For an explanation of the wind turbine according to the invention and of the computer program product according the invention, reference is made to the statements above.

BRIEF DESCRIPTION OF THE DRAWINGS

The invention will now be described by way of example on the basis of a preferred embodiment with reference to the accompanying drawings, in which:

FIG. 1: shows a schematic depiction of a wind turbine designed to perform the method according to the invention;

FIG. 2: shows a schematic depiction of the supply of a parameter block to the safety system of the wind turbine shown in FIG. 1; and FIG. 3: shows a schematic depiction of the use of a parameter block by the safety system of the wind turbine shown in FIG. 1.

DETAILED DESCRIPTION

FIG. 1 schematically depicts a wind turbine 10 designed to perform the method according to the invention.

To convert wind energy into electrical energy, the wind turbine 10 comprises a rotor 13, which is fastened to a nacelle 12 mounted rotatably on a tower 11, having two or three rotor blades 14 that are adjustable in terms of their blade angle. The rotor 13 drives a generator 15, possibly with the interposition of a gear system. At least some of the electric power coming from the generator 15 is converted via a converter 16 and a transformer 17 in order to be supplied to a high- or medium-voltage grid 18. The conversion is effected such that the electric power meets the requirements of the high- or medium-voltage grid 17 in terms of voltage amplitude, frequency and phase shift.

In order to control the wind turbine 10 there is provision for a management system 20, which is connected to the individual components of the wind turbine 10 and to various sensors via control lines, not shown. The management system 20 can act on the components of the wind turbine 10 such that the wind turbine 10 is operated at a desired operating point and the electrical energy is supplied in accordance with the requirements of the grid 18. The management system 20 controls the wind turbine 10 on the basis of the measured values detected via the sensors and calculated or prescribed setpoint values, which are combined to form operational characteristic values 24 (see FIGS. 2 and 3), on the basis of parameterized control rules, the variable parameterization values of which can be combined in a parameter set. The management system 20 has a communication unit 21, which is connected to the Internet 40.

Likewise connected to the Internet 40 is a server 41 having a database 42. The server 41 and the management system 20 are designed to update a parameter set used by the management system 20 with a new parameter set, stored in the database 42, in a known manner. The Internet 40 can furthermore also be used to supply control signals, for example from the grid operator, to the management system 20.

The wind turbine 10 furthermore comprises a safety system 30 for monitoring the wind turbine 10 on the basis of operational characteristic values provided via the management system 20, diverted from the sensors of the management system 20 directly and/or ascertained by sensors separately intended for the safety system 30. The operational characteristic values can be measured values and/or can be setpoint values ascertained or needing to be taken into consideration by the management system 20.

The safety system 30 is designed to transfer the wind turbine 10 to a safe plant state completely independently of the management system 20, and hence for example in the event of complete failure of the management system 20, if safety-critical operational characteristic values infringe safety parameters stored in the safety system 30. In the exemplary embodiment depicted, the wind turbine 10 is stopped in such a case.

The aforementioned safety parameters can be updated via the Internet 40 in accordance with the method according to the invention described below.

As depicted schematically in FIG. 2, sixty safety parameters 51 are combined with various safety features 52.1, 52.2, 52.3, 52.4, 52.5 to form a parameter block 50 and stored in the database 42.

The safety feature 52.1 is details concerning the type and configuration of the wind turbine 10 for which the parameter block 50 or the safety parameters 51 contained therein are intended. The safety feature 52.2 indicated is a maximum permissible operating period for the parameter block 50, which can be used to ensure that the safety parameters 51 contained in the parameter block 50 are not used for longer than intended.

Those details in the parameter block 50 that are not part of the safety parameters 51 (that is to say for example including the safety features 52.1 and 52.2), and some of the safety parameters 51, are encrypted (safety feature 52.3), while the remainder of the safety parameters 51 are used to form a hash value (safety feature 52.4). The entire parameter block 50 is additionally used to form a checksum (safety feature 52.5) suitable for the cyclic redundancy check.

The parameter block 50 can, if required, be transmitted from the server 41 via the Internet 40 to the communication unit 21 of the management system 20, which in the example depicted is a distributed system having in each case a parameterized main control unit 22 and a blade angle control unit 23, which take operational characteristic values 24 as a basis for controlling the wind turbine 10 on the basis of prescribed rules.

The communication unit 21 transmits the parameter block 50 to the safety system 30, which has a memory area 31 for received parameter blocks 50. This can involve a single parameter block 50 being transmitted to the safety system 30. It is alternatively possible for multiple parameter blocks 50 to be combined to form a parameter block set and then for just the latter to be transmitted. This can involve at least some of the described safety features, such as for example the checksum 52.5, being ascertained not for each parameter block 50 of a parameter block set individually but rather just for the parameter block set as a whole.

In the depicted exemplary embodiment in this instance the communication unit 21 already checks some of the safety features 52 of the parameter block 50. As such, the checksum 52.5 is used to check whether the data transmission has taken place without error and, if not and if this is possible, to make a correction to the data via a cyclic redundancy check. It is subsequently checked whether the encrypted data 52.3 can be decrypted, and a check on the hash value 52.4 takes place. Only if these checks are completed successfully is the (decrypted) parameter block 50 supplied to the memory area 31 of the safety system 30. The checks described above can alternatively also be performed directly by the safety system 30, the communication unit 21 then forwarding the parameter block 50 merely as received to the safety system, and the checksum, hash value and encryption checks being performed there.

The safety system 30 subsequently checks whether the details 52.1 concerning the type and configuration of the wind turbine 10 that are contained in the received parameter block 50 are concordant with the corresponding configuration parameters stored in the memory of the main control unit 22 of the management system 20, with the configuration parameters being used as check information 24.1. Alternatively, some of the check information 24.1 required for this comparison may also be selected by means of switching elements 25, as are depicted in FIG. 3.

Additionally, the safety system 30 uses the validity period 52.2 to also check whether the loaded parameter block 50 is fundamentally valid.

If one of the checks explained above has returned a negative result, the received parameter block 50 is marked as invalid and possibly erased from the memory area 31. Depending on which of the above checks has had a negative outcome, the parameter block 50 in the memory area 31 can be subjected to the checks in question again, specifically at a later time, it then possibly being identified as valid. In particular if the check with a negative outcome cannot be expected to return a different result in future either, the parameter block 50 can also be rejected immediately.

If the outcome of the checks is completely positive, the parameter block 50 in the memory area 31 of the safety system 30 persists and can be used for the actual monitoring of the wind turbine 10.

Besides the memory area 31 for received parameter blocks 50, the safety system 30 also comprises a memory area 34, 34' for default parameter blocks 50', one portion of the memory area 34 storing invariable default parameter blocks 50', for example permanently compiled in the control software, while the default parameter blocks 50' in the other portion of the memory area 34' can be updated in a similar manner to the described method for updating the parameter blocks 50 in the memory area 31.

One of the default parameter blocks 50' can be a universal default parameter block, which is valid for all modes of operation of the wind turbine and at any time. Owing to the general validity, this universal default parameter block can be permanently compiled in the control software and does not subsequently have to be subjected to any further safety check. The universal default parameter block can even define a safe plant state, in particular a stoppage or safe spin mode of the wind turbine, independently of the type and configuration of the wind turbine.

FIG. 3 explains an ultimate use of parameter blocks 50 and default parameter blocks 50' for monitoring the wind turbine 10. In principle, parameter blocks 50 and default parameter blocks 50' are used completely analogously in this instance, which is why the explanations below regarding the use of a default parameter block 50' also for parameter blocks 50, but with the proviso that the monitoring on the basis of a loaded parameter block 50 can take place only if a valid default parameter set is also available for the active mode of operation of the wind turbine 10 at the same time. The valid default parameter set can be in particular a universal default parameter set.

In the variant embodiment depicted in FIG. 3 a large proportion of the safety features 52.1-52.5, including those that have already been checked in connection with the transmission shown in FIG. 2, are checked again. This, in some cases also repeated, checking of the safety features increases the reliability of the safety system 30 even further.

In FIG. 3 the main control unit 22 has switching elements 25 that are used to specify the configuration of the wind turbine 10, the type of which is stored as an operational characteristic value 24. In the depicted exemplary embodiment the switching elements 25 are used to input for example a coding that is reflected by the types of the tower 11, the rotor blades 14, the generator 15, the converter 16 and/or other components installed in the wind turbine 10. Advantageously, the switching elements are in a form such that they allow a unique coding of the plant configuration. However, it is naturally also possible for the applicable information to be stored as a direct part of the configuration parameters 24.1, in which case the switching elements 25 can be dispensed with. The switching elements 25 are arranged directly on the wind turbine 10. The selection of the described coding directly in situ at the wind turbine 10 ensures that incorrect or intentionally manipulated parameter blocks 50 are not accepted, since they will fundamentally not match the plant configuration indicated by means of the coding.

As an alternative to the rotary switches depicted in FIG. 3, the switching element 25 can also comprise DIP switches, for example 32-bit DIP switches, which can easily be checked.

The main control unit 22 of the management system 20 prescribes the present mode of operation of the wind turbine 10 to the safety system 30 as codes 24.2 available in the form of an operational characteristic value. Based on this code 24.2 the management system 20 first of all checks whether the memory area 31 contains a parameter block 50 that is valid for this mode of operation. If this is not the case the default parameter block 50' valid for the mode of operation is ascertained, the memory area 34' first being searched for valid default parameter blocks 50' in this case too before the default parameter blocks 50' and in the last instance possibly a universal default parameter set in the memory area 34 is resorted to.

The default parameter blocks 50' are also resorted to (in the prescribed order) if a parameter block 50 that is fundamentally suitable for the present mode of operation, but for which the checks described below cannot all be completed with a positive result, is found in the memory area 31. The same applies to the passage of default parameter blocks 50' from the memory area 34' and default parameter blocks 50' from the memory area 34. If no valid parameter block 50 or default parameter block 50' at all is found for the present mode of operation, the wind turbine 10 is immediately stopped or transferred to a safe plant state. The latter can be achieved in particular by resorting to a universal default parameter set.

Before a parameter block 50 or default parameter block 50' fundamentally identified by means of the mode of operation 24.2 is used, the safety system 30 uses comparison modules 32 to compare the configuration parameters 24.1 and possibly other general information 24.3 concerning the present mode of operation, and also the coding, allocated by means of the switching elements 25, of the plant configuration, against corresponding safety features 52 in the parameter block 50 or default parameter block 50' that is to be checked. Only if all checks are completed with a positive result is the checked parameter block 50 or default parameter block 50' used for monitoring the wind turbine 10. If this is not the case, then instead of the checked parameter block 50 or default parameter block 50' another, fundamentally possible, parameter block 50 or default parameter block 50' is checked in the order indicated above until a valid parameter block 50 or default parameter block 50' is found. If no valid parameter block 50 or default parameter block 50' is found, the wind turbine 10 is stopped or transferred to a safe plant state. This can be accomplished in particular by resorting to a universal default parameter set that defines the desired plant state.

The parameter block 50 or default parameter block 50' currently used for monitoring is checked for its validity at regular intervals so as to be able to determine that the maximum permissible operating period has expired, for example. In this case the safety system 30 will ascertain a valid parameter block 50 or default parameter block 50' in the manner described.

The actual monitoring of the operation of the wind turbine 10 is effected essentially as known from the prior art, which is why it only needs to be outlined briefly below.

There is provision both in the main control unit 22 and in the blade angle control unit 23 for computation modules 26 that ascertain a check value from some respective predefined values among the operational characteristic values 24 available in each of the control units, said check value then being transmitted to the safety system 30. There, the check value is compared against safety parameters 51 contained in the respective present parameter block 50. If the check value is outside the range prescribed by the safety parameters 51, the safety system 30 triggers an emergency stop for the wind turbine.

Besides the check values supplied by the main control unit 22 and the blade angle control unit 23, the safety system 30 also monitors directly measured values, for example in respect of the speed of the rotor 13 or the vibrations in the nacelle 12, in the same way and stops the wind turbine 10, or transfers it to a safe spin mode, if these values leave an operating range prescribed by means of safety parameters 51 of the respective present parameter block 50, 50'. These values, which are measured completely independently of the management system 20, need to have particularly high demands placed on them in regard to the measured values being free of error, which is why particularly reliable sensors and evaluation electronics are preferably resorted to for these measured values.

The invention claimed is:

1. A method for operating a wind turbine comprising a management system for controlling the wind turbine according to prescribed rules and a safety system, separate from the management system, for monitoring the wind turbine on the basis of operational characteristic values, wherein the safety system transfers the wind turbine to a safe plant state independently of the management system in response to safety-critical operational characteristic values violating safety parameters stored in the safety system, wherein in order to change at least one safety parameter of the safety parameters stored in the safety system a parameter block comprising the at least one safety parameter and at least two safety features is supplied to the safety system and accepted by the safety system for the monitoring only after a positive check on all of the safety features, wherein the check on at least one of the safety features requires comparison against check information available directly on the wind turbine and the parameter block comprises information about an operating state for which the contained safety parameters are valid and the safety system applies the safety parameters intended for the respective present operating state of the wind turbine.

2. The method of claim 1, wherein the check information comprises at least one configuration parameter, wherein at least part of at least one further safety feature relates to the safety parameters.

3. The method of claim 1, wherein the safety features comprise at least one checksum, a cyclic redundancy check, a hash value and/or a digital signature or encryption for the safety parameters, the parameter block and/or respective parts thereof.

4. The method of claim 1, wherein the safety features comprise a validity period contained in the parameter block.

5. The method of claim 1, wherein the parameter block contains information about a maximum permissible operating period under the safety parameters contained therein.

6. The method of claim 1, wherein the safety system comprises a default parameter block or a default safety parameter for in response to no valid parameter block or no valid safety parameters being available for the present operating state of the wind turbine.

7. The method of claim 1, wherein the safety system has a memory for storing multiple parameter blocks and designed to take a state of operation of the wind turbine as a basis for performing the safety monitoring on the basis of the safety parameters of a respective valid parameter block.

8. The method of claim 1, wherein the safety parameters comprise a maximum rotational speed to avoid an overspeed or a limit value for maximum permissible vibrations.

9. The method of claim 1, wherein the parameter block comprises 5 to 60 safety parameters.

10. A method for operating a wind turbine comprising a management system for controlling the wind turbine according to prescribed rules and a safety system, separate from the management system, for monitoring the wind turbine on the basis of operational characteristic values, wherein the safety system transfers the wind turbine to a safe plant state independently of the management system in response to safety-critical operational characteristic values violating safety parameters stored in the safety system, wherein in order to change at least one safety parameter of the safety parameters stored in the safety system a parameter block comprising the at least one safety parameter and at least two safety features is supplied to the safety system and accepted by the safety system for the monitoring only after a positive check on all of the safety features, wherein the check on at least one of the safety features requires comparison against check information available directly on the wind turbine and the safety features comprise data suitable for comparison against control rules applied by the management system, wherein the control rules are parameterized and the data are designed for comparison against the parameterization values of the control rules and/or checksums formed therefrom.

11. The method of claim 10, wherein the check information comprises at least one configuration parameter, wherein at least part of at least one further safety feature relates to the safety parameters.

12. The method of claim 10, wherein the safety features comprise at least one checksum, a cyclic redundancy check, a hash value and/or a digital signature or encryption for the safety parameters, the parameter block and/or respective parts thereof.

13. The method of claim 10, wherein the safety features comprise a validity period contained in the parameter block.

14. The method of claim 10, wherein the parameter block contains information about a maximum permissible operating period under the safety parameters contained therein.

15. The method of claim 10, wherein the safety system comprises a default parameter block or a default safety parameter in response to no valid parameter block or no valid safety parameters being available for the present operating state of the wind turbine.

16. The method of claim 10, wherein the safety system has a memory for storing multiple parameter blocks and designed to take a state of operation of the wind turbine as a basis for performing the safety monitoring on the basis of the safety parameters of a respective valid parameter block.

17. A method for operating a wind turbine comprising a management system for controlling the wind turbine according to prescribed rules and a safety system, separate from the management system, for monitoring the wind turbine on the basis of operational characteristic values, wherein the safety system transfers the wind turbine to a safe plant state independently of the management system in response to safety-critical operational characteristic values violating safety parameters stored in the safety system, wherein in order to change at least one safety parameter of the safety parameters stored in the safety system a parameter block comprising the at least one safety parameter and at least two safety features is supplied to the safety system and accepted by the safety system for the monitoring only after a positive check on all of the safety features, wherein the check on at least one of the safety features requires comparison against check information available directly on the wind turbine and updating a parameter set used by the management system does not require a positive check of safety features available directly on the wind turbine.

18. The method of claim 17, wherein the check information comprises at least one configuration parameter, wherein at least part of at least one further safety feature relates to the safety parameters.

19. The method of claim 17, wherein the safety features comprise at least one checksum, a cyclic redundancy check, a hash value and/or a digital signature or encryption for the safety parameters, the parameter block-and/or respective parts thereof.

20. The method of claim 17, wherein the safety features comprise a validity period contained in the parameter block.

* * * * *